United States Patent
Natarajan et al.

(10) Patent No.: US 10,187,313 B2
(45) Date of Patent: Jan. 22, 2019

(54) WIRELESS COMMUNICATION DEVICE, PERIPHERAL, AND METHOD FOR MANAGING VALUES OF OPERATING PARAMETERS FOR A PERIPHERAL COMMUNICATION INTERFACE

(71) Applicant: Motorola Mobility LLC, Chicago, IL (US)

(72) Inventors: Vimal Natarajan, Palatine, IL (US); Mohammed Abdul-Gaffoor, Palatine, IL (US); Minh H. Duong, Lake Bluff, IL (US); Jarrett Simerson, Glenview, IL (US); Nathan Connell, Glenview, IL (US)

(73) Assignee: Motorola Mobility LLC, Chicago, IL (US)

( * ) Notice: Subject to any disclaimer, the term of this patent is extended or adjusted under 35 U.S.C. 154(b) by 107 days.

(21) Appl. No.: 15/611,181

(22) Filed: Jun. 1, 2017

(65) Prior Publication Data

US 2018/0351872 A1    Dec. 6, 2018

(51) Int. Cl.
*H04L 1/00* (2006.01)
*H04L 12/825* (2013.01)
(Continued)

(52) U.S. Cl.
CPC ............ *H04L 47/25* (2013.01); *H04B 17/318* (2015.01); *H04L 43/16* (2013.01); *H04M 1/0254* (2013.01); *H04W 24/08* (2013.01)

(58) Field of Classification Search
CPC ...... H04L 47/25; H04L 43/16; H04M 1/0254; H04W 24/08
(Continued)

(56) References Cited

U.S. PATENT DOCUMENTS

| 8,560,016 B2 | 10/2013 | Duong et al. |
| 2011/0072292 A1* | 3/2011 | Khawand ............ G06F 1/3203 713/340 |

(Continued)

FOREIGN PATENT DOCUMENTS

EP    2625906 A1    8/2013

*Primary Examiner* — Sai Ming Chan
(74) *Attorney, Agent, or Firm* — Lawrence J. Chapa

(57) ABSTRACT

The present application is directed to managing values of operating parameters used to communicate via the peripheral communication interface so as to adjust any impact on the wireless communication interface. A corresponding method includes monitoring a performance of a wireless communication via the wireless communication interface, while the wireless communication device is communicating with a coupled peripheral via the peripheral communication interface. A reference power associated with the wireless communication via the wireless communication interface falling below a first predefined threshold is detected. When the reference power which has been detected is below the first predefined threshold, a relative signal quality measurement for the wireless communication via the wireless communication interface is determined for each of a plurality of different sets of values of operating parameters associated with the peripheral communication interface. A selection is then made between each of the determined relative signal quality measurements, which respectively correspond to each of the plurality of different sets of values of operating parameters associated with the peripheral device, and the corresponding set of values of operating parameters associated with the selected determined relative signal quality measurement is applied to the peripheral communication interface.

20 Claims, 4 Drawing Sheets

(51) Int. Cl.
      *H04M 1/02*       (2006.01)
      *H04W 24/08*     (2009.01)
      *H04B 17/318*    (2015.01)
      *H04L 12/26*      (2006.01)

(58) Field of Classification Search
      USPC ........................................................ 370/230
      See application file for complete search history.

(56) References Cited

U.S. PATENT DOCUMENTS

2016/0073351 A1*   3/2016   Cardozo ........... H04W 52/0258
                                                                                            455/574
2016/0360462 A1*  12/2016   Chockalingam ...... H04W 36/30
2017/0295585 A1*  10/2017   Sorrentino .............. H04L 5/001

* cited by examiner

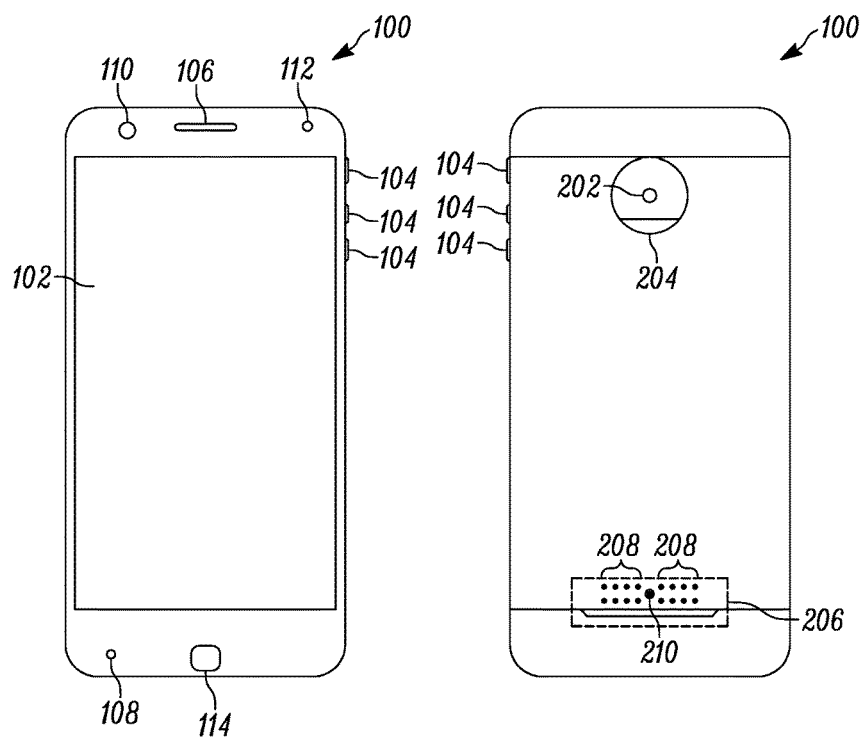
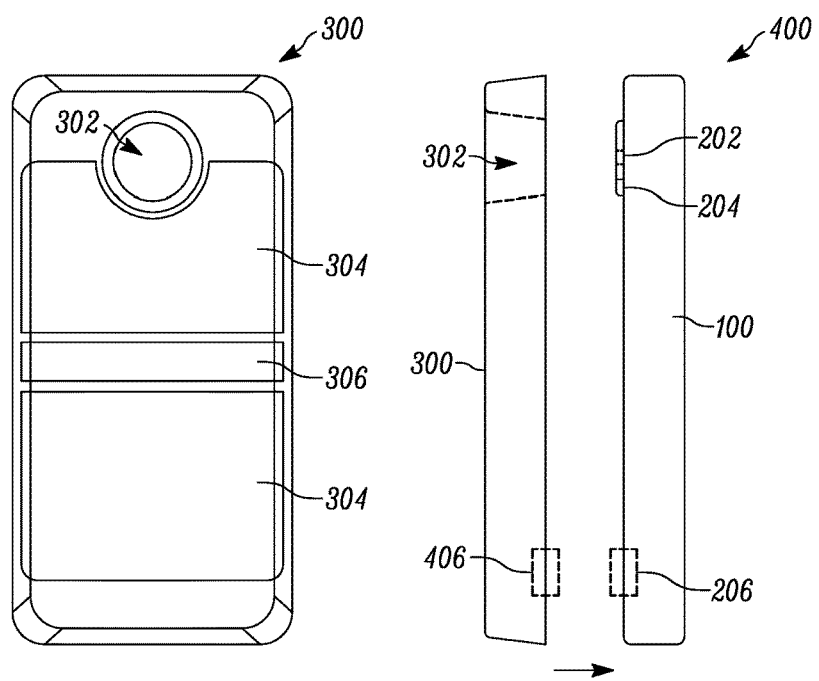

| GEAR | RATE A (Mbps) | RATE B (Mbps) |
|---|---|---|
| 1 | 1,248 | 1,457.6 |
| 2 | 2,496 | 2,915.2 |
| 3 | 4,992 | 5,830.4 |

FIG. 6

| GEAR | THRESHOLD (RSRP) |
|---|---|
| 1A | -120 |
| 1B | -110 |
| 2A | -90 |
| 2B | -90 |
| 3A | -85 |
| 3B | -85 |

FIG. 7

| GEAR | AMPLITUDE |
|---|---|
| 3B | L ONLY |
| 3A | L OR S |
| 2B | NONE |
| 2A | NONE |
| 1B | NONE |
| 1A | NONE |

FIG. 8

WIRELESS COMMUNICATION DEVICE, PERIPHERAL, AND METHOD FOR MANAGING VALUES OF OPERATING PARAMETERS FOR A PERIPHERAL COMMUNICATION INTERFACE

FIELD OF THE INVENTION

The present invention relates generally to managing the use of a peripheral with a wireless communication device, and more particularly, to managing the operation of the peripheral communication interface relative to the operation of the wireless communication interface of the wireless communication device.

BACKGROUND OF THE INVENTION

During the recent past, wireless communication devices including cellular telephones have transitioned from communication devices dedicated to making a wireless voice call, to multifunction devices capable of voice communications, data communications and web access. Wireless communication devices have generally become increasingly more capable, with the newer devices generally continuing to incorporate more and more functionality. However, it is not always practical to incorporate every possible feature into a device, that one or more of its many users may find beneficial to include and have be present in the device. This can be the case, where use of the feature may be infrequent, and/or the space requirements in connection with the additional features, when considered in connection to the frequency of use, do not justify a permanent presence in the device.

In some instances, a particular feature can be supported through the use of a peripheral, which can be selectively coupled to the main device as needed. By being implemented as a peripheral, as opposed to a separate stand alone device, one can leverage the processing, storage and communication capabilities of the main device, so as to more selectively implement the additional features into the device, while still leveraging the synergistic benefits associated with including the additional features into the main device.

Incorporating the feature into a peripheral, allows those users that want to make use of the particular feature to be able to choose to acquire the peripheral. Furthermore, the peripheral and features which they support could then be separated from and correspondingly selectively paired with the device, so as to correspond to those instances in which the features the peripheral supports are needed or desired. In at least some instances, examples of features that one or more peripherals can have include extended image capture, audio projection, power storage, and/or image projection capabilities. However a device peripheral pairing generally involves the need to be able to share data between the two elements. In at least some instances the interaction between the base device and the peripheral can have a negative impact on other communication interfaces including wireless communication capabilities of the main device. Even though a particular interface may involve a wired connection, the energy being conveyed through the wired connection will generally have some portion that extends beyond the constraints of the corresponding wires, which in turn depending upon the nature and the amount of energy which extends beyond the constraints, may have an opportunity to impact other communication connections.

During the design process, the related structure associated with the communication of signals within a device can often be managed, where the designers generally have control over the various aspects of the design that in turn can have an impact on other forms of communication. However with some peripherals, including those peripherals that in at least some instances can be implemented and designed by an entity separate from the designer of a particular base device, a particular peripheral and device combination can have an increased chance of interacting in ways that can not always be readily foreseen and/or conveniently anticipated.

The present inventors have recognized that by controlling the operation of the peripheral communication interface including the characteristics of the signaling which is taking place across the peripheral communication interface, that the impact upon other communication interfaces, such as the wireless communication interface, can be better managed, while also taking into account the corresponding affect on the performance of the peripheral communication interface.

SUMMARY OF THE INVENTION

The present invention provides a method in a wireless communication device, which has a wireless communication interface coupled to an antenna via at least one of a transmitter and a receiver, through which the wireless communication device can communicate with one or more other wireless communication devices, and which has a peripheral communication interface, separate from the wireless communication interface, for communicatively coupling to at least one of one or more peripherals. The method manages values of operating parameters used to communicate via the peripheral communication interface so as to reduce an impact on wireless communications via the wireless communication interface. The method includes monitoring a performance of a wireless communication via the wireless communication interface, while the wireless communication device is communicating with a coupled peripheral via the peripheral communication interface. The method further includes detecting a reference power associated with the wireless communication via the wireless communication interface falling below a first predefined threshold. When the reference power which has been detected is below the first predefined threshold, a relative signal quality measurement for the wireless communication via the wireless communication interface is determined for each of a plurality of different sets of values of operating parameters associated with the peripheral communication interface. A selection is then made between each of the determined relative signal quality measurements, which respectively correspond to each of the plurality of different sets of values of operating parameters associated with the peripheral device, and the corresponding set of values of operating parameters associated with the selected determined relative signal quality measurement is applied to the peripheral communication interface.

In at least some instances, the method further provides for storing the results of the selection between each of the determined relative signal quality measurements including the corresponding set of values of operating parameters that are applied, and which are associated with the operating conditions of the wireless communication interface, when the relative signal quality measurements were determined.

In at least some further instances, once the results of a particular selection is determined and stored, when future conditions, which correspond to the stored values are determined to exist, the stored values of associated operating parameter values can be used without a more recent determination of the relative signal quality measurements for each of the plurality of different sets of values of operating parameters associated with the peripheral communication interface.

The present invention further provides a wireless communication device adapted for use with one or more selectively coupleable peripherals. The wireless communication device includes a wireless communication interface coupled to an antenna via at least one of a transmitter and a receiver, through which the wireless communication device can communicate with one or more other wireless communication devices. The wireless communication device further includes a peripheral communication interface, separate from the wireless communication interface, for communicatively coupling to at least one of the one or more selectively coupled peripherals; and a peripheral communication interface management controller for managing the peripheral communication interface, including when the wireless communication device is communicating with the one or more other wireless communication devices via the wireless communication interface. The peripheral communication interface management controller includes a performance monitoring module adapted for receiving information about a performance of a wireless communication via the wireless communication interface, while the wireless communication device is communicating with a coupled peripheral via the peripheral communication interface. The peripheral communication interface management controller further includes a reference power threshold detection module adapted for detecting a reference power associated with the wireless communication via the wireless communication interface falling below a first predefined threshold. The peripheral communication interface management controller still further includes a relative signal quality measurement determination module adapted for determining a relative signal quality measurement for the wireless communication via the wireless communication interface for each of a plurality of different sets of values of operating parameters associated with the peripheral communication interface, when the reference power which has been detected is below the first predefined threshold, and a peripheral communication interface operation parameter value selection module adapted for selecting between each of the determined relative signal quality measurements, which respectively correspond to each of the plurality of different sets of values of operating parameters, and applying the corresponding set of values of operating parameters associated with the selected determined relative signal quality measurement to the peripheral communication interface.

The present invention still further provides a peripheral adapted for use with a wireless communication device. The peripheral includes a peripheral communication interface, via which the peripheral is adapted for communicating with an attached wireless communication device. The peripheral further includes a permissible operating parameter values controller, which is adapted for identifying a type of wireless communication device to which the peripheral is attached, and supplying different sets of values of operating parameters, which are permissible in support of communication between the wireless communication device and the peripheral.

These and other objects, features, and advantages of this invention are evident from the following description of one or more preferred embodiments of this invention, with reference to the accompanying drawings.

BRIEF DESCRIPTION OF THE DRAWINGS

FIG. 1 is a front view of an exemplary wireless communication device;

FIG. 2 is a back view of an exemplary wireless communication device;

FIG. 3 is a front view of an exemplary peripheral;

FIG. 4 is a side view of the wireless communication device, illustrated in FIGS. 1 and 2, and the peripheral, illustrated in FIG. 3, which highlights an anticipated interaction between their respective back side surfaces;

FIG. 6 is a table highlighting multiple gears, each having multiple predefined data rates, which can be used in connection with defining at least one of the operating characteristics associated a peripheral communication interface;

FIG. 7 is a table, which associates examples of respective reference power thresholds with each of the multiple potential predefined data rates;

FIG. 8 is a table, which illustrates an exemplary predefined list of acceptable data rates and corresponding signal amplitudes, which are sufficient for supporting the proper functioning of a peripheral with a wireless communication device.

DETAILED DESCRIPTION OF THE PREFERRED EMBODIMENT(S)

Figure 5:
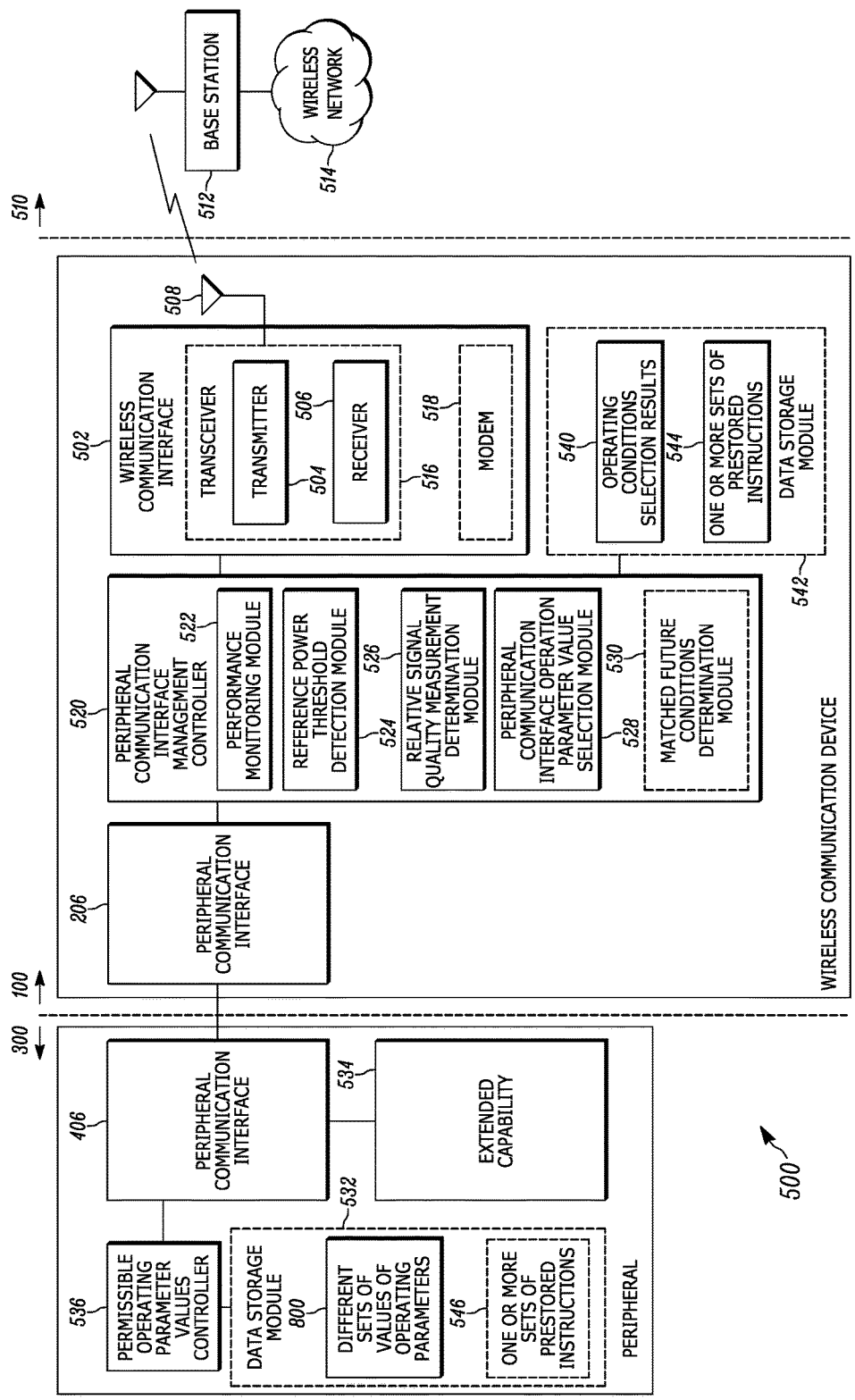
FIG. 5 is a block diagram including a peripheral, a wireless communication device and an exemplary network environment, in accordance with at least one embodiment.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

FIG. 1 illustrates a front view of an exemplary wireless communication device 100. While in the illustrated embodiment, the type of wireless communication device shown is a radio frequency cellular telephone, which includes a wireless communication interface for supporting wireless communications with one or more other wireless communication devices, and includes a peripheral communication interface for supporting communications between the wireless communication device and a selectively associated peripheral, other types of devices that include wireless radio frequency communication and a peripheral communication interface for supporting communications between the wireless communication device and a selectively associated peripheral are also relevant to the present application. In other words, the present application is generally applicable to wireless communication devices beyond the type being specifically shown. A couple of additional examples of suitable wireless communication devices that may additionally be relevant to the present application in the management of the operation of a peripheral communication interface relative to the operation of the wireless communication interface of the wireless communication device can include a tablet, a laptop computer, a desktop computer, a netbook, a cordless telephone, a selective call receiver, a gaming device, a personal digital assistant, as well as any other form of wireless communication device that may include the use of one or more peripherals.

In the illustrated embodiment, the wireless communication device 100 includes a display 102 which covers a large portion of the front facing. In at least some instances, the display can incorporate a touch sensitive matrix, that can help facilitate the detection of one or more user inputs relative to at least some portions of the display, including an interaction with visual elements being presented to the user via the display 102. In some instances, the visual element could be an object with which the user can interact. In other instances, the visual element can form part of a visual representation of a keyboard including one or more virtual keys and/or one or more buttons with which the user can interact and/or select for a simulated actuation. In addition to one or more virtual user actuatable buttons or keys, the device 100 can include one or more physical user actuatable buttons 104. In the particular embodiment illustrated, the device has three such buttons located along the right side of the device.

The exemplary wireless communication device 100, illustrated in FIG. 1, additionally includes a speaker 106 and a microphone 108 in support of voice communications. The speaker 106 may additionally support the reproduction of an audio signal, which could be a stand-alone signal, such as for use in the playing of music, or can be part of a multimedia presentation, such as for use in the playing of a movie, which might have at least an audio as well as a visual component. The speaker may also include the capability to also produce a vibratory effect. However, in some instances, the purposeful production of vibrational effects may be associated with a separate element, not shown, which is internal to the device. Generally, the speaker 106 is located toward the top of the device 100, which corresponds to an orientation consistent with the respective portion of the device facing in an upward direction during usage in support of a voice communication. In such an instance, the speaker 106 might be intended to align with the ear of the user, and the microphone 108 might be intended to align with the mouth of the user. Also located near the top of the device, in the illustrated embodiment, is a front facing camera 110, and a corresponding flash 112. In the illustrated embodiment, the wireless communication device 100 further includes a fingerprint sensor 114.

FIG. 2 illustrates a back view of the exemplary wireless communication device 100, illustrated in FIG. 1. In the back view of the exemplary wireless communication device, the three physical user actuatable buttons 104, which are visible in the front view, can similarly be seen. The exemplary wireless communication device additionally includes a back side facing camera 202 with a flash 204, as well as a peripheral communication interface 206. In the illustrated embodiment, the peripheral communication interface 206 includes multiple conductive elements, which are intended to connect with corresponding structure in another device, such as a peripheral that can be brought within proximity and/or in contact with the other device. More specifically, in the illustrated embodiment, the peripheral communication interface 206 can include conductive pins or ports 208 that allow individual signals to be conveyed to another device 300 having a corresponding structure 406, electronically. The peripheral communication interface 206 can additionally include still further structure 210, such as a registration pin, that would support proper alignment with the corresponding structure 406 of the other device 300. The peripheral communication interface 206 is generally adapted for conveying electrical signals, which can include data and/or power signals.

While a particular peripheral communication interface is illustrated, one skilled in the art will appreciate that the peripheral communication interface can take alternative and/or still further forms via which data and/or power signals can be conveyed between a peripheral and a base device. In at least some instances, the structure that can support such an interface can include forms which are compatible with various industry standards, such as Universal Serial Bus (USB), Peripheral Component Interconnect Express (PCIE), Subscriber Identity Module (SIM), etc., type standards and/or interfaces.

FIG. 3 illustrates a front view of an exemplary peripheral 300, which could be used in connection with a wireless communication device 100, such as the one illustrated in FIGS. 1 and 2, in order to provide an extension of capabilities that can be used in conjunction with the wireless communication device 100, to which it is associated and/or attached. As noted previously, because a peripheral can be selectively associated with and/or attached to another device, the peripheral may offer opportunities to customize the use of a wireless device in instance where and when the extended capabilities provided by the peripheral are desired. In at least some instances, examples of extended features that one or more peripherals can have include enhanced image capture, audio projection, power storage and/or image projection capabilities.

In some cases, the form factor for a particular peripheral can take into account the structural details of the device(s) to which it is intended to be attached, and/or with which it is intended to be used. For example, in the illustrated embodiment, the peripheral 300 has a size and shape, which generally conforms to the overall size of the back side of the wireless communication device 100, which is illustrated in FIG. 2. The peripheral 300 even includes a circular opening 302, which is sized and positioned, so as to coincide with the proximate position of the combination rear facing camera 202 and flash 204 of the wireless communication device 100, such that when the wireless communication device 100 and the peripheral 300 are brought together, there will not be an obstruction of the combination camera 202 and flash 204 located on the back side surface of the device 100.

In the particular embodiment illustrated, the peripheral 300 is intended to provide the extended feature of enhanced audio projection. More specifically, the particular peripheral illustrated provides the use of additional and/or alternative speakers. At least two regions 304 represent areas behind which the additional speakers are located. Between the two speaker regions 304, a stand 306 is located, which can be hinged at one end, so as to enable the other end of the stand 306 to fold at least partially away from the body of the peripheral 300. When folded at least partially away from the body, the stand can assist in enabling the peripheral to be able to be leaned upward from its side edge. While a peripheral which allows for an extended audio projection capability is shown, the use of other peripherals with the wireless communication device 100 including different types of peripherals are possible without departing from the teachings of the present invention.

FIG. 4 illustrate a side view 400 of the wireless communication device 100, illustrated in FIGS. 1 and 2, and the peripheral 300, illustrated in FIG. 3, which highlights an anticipated interaction between their respective back side surfaces, as the peripheral 300 is brought toward the wireless communication device 100. As noted previously the peripheral includes a circular opening 302, which can be arranged to coincide with the location of the of the combination rear facing camera 202 and flash 204 of the wireless communication device 100. Furthermore, the peripheral 300 can include a peripheral communication interface 406, which similarly is arranged to coincide with the location of a peripheral communication interface 206, that is associated with the wireless communication device 100. In such an instance, the peripheral communication interface 406 of the peripheral 300 can have conductive pins or ports that are intended to interact with the corresponding pins and ports 208 of the wireless communication device and which allow individual signals including data and power to be conveyed between the two devices 100 and 300, when they are brought together. In at least some instances magnets, not shown, can be used to hold the two devices 100 and 300 together, and can also be used to help maintain a proper alignment between the two, when they are brought together.

When the peripheral 300 is operatively coupled to the wireless communication device 100, the extended capabilities of the peripheral 300 can be used to augment the capabilities of the wireless communication device 100. In conjunction with functioning together, the two device 100 and 300 will likely need to exchange data. For example, a peripheral 300 which extends the capabilities of the wireless communication device 100 with additional audio projection capabilities will often need to have a source for the audio signal that is to be alternatively and/or additionally played through the peripheral 300. A certain amount of data throughput will need to be supported by the peripheral communication interface for conveying the data associated with the audio signal without affecting the intended performance of the peripheral. However, in some instances, the conveyance of data between the peripheral 300 and the wireless communication device 100 via the respective peripheral communication interfaces 406 and 206 can have an impact on a wireless signal that may be being concurrently conveyed by the wireless communication device 100. In some instances, the use of different conveyance characteristics of the peripheral communication interface can have a varying effect on any corresponding wireless communication. As such, the inventors have recognized that it may be possible to manage the characteristics of the signaling which is taking place across the peripheral communication interface, so as to alter the impact upon other communication interfaces, such as the wireless communication interface, in a way that may overall help to mitigate and/or reduce any negative consequences.

FIG. 5 illustrates a block diagram 500 including a peripheral 300, a wireless communication device 100 and an exemplary network environment 510, in accordance with at least one embodiment. More specifically, the wireless communication device 100 includes a wireless communication interface 502 having at least one of a transmitter 504 and a receiver 506, which can sometimes take the form of a transceiver 516, and which is coupled to an antenna 508, through which the wireless communication device 100 can communicate with one or more other wireless communication devices. The wireless communication interface can additionally include a modem 518. In at least some instances, the wireless communication device 100 will communicate directly with the intended target of its wireless communication. In other instances, the wireless communication device 100 will communicate with the intended target of its wireless communication via network infrastructure, such as an exemplary network environment 510. The exemplary network environment 510 can include one or more base stations 512, as well as further supporting infrastructure, which can form all or parts of a wireless network 514.

In at least some instances, the wireless network 514 can include various public, private and personal networks, packet data and/or circuit switched networks, as well as various wide-area and local-area networks. More specifically, in at least some instances, the wireless network 514 can be used to support one or more forms of cellular communications, where access to the network can be supported through the one or more base stations 512, which may each be used to support wireless network access relative to a particular geographical area. Where the intended target of the wireless communication is another wireless communication device, connection to the wireless network 514 for the other wireless communication device may be supported by the same 512 or a different base station.

The various communication connections between the different devices and/or network elements can additionally involve one or more different communication standards. At least a couple of examples of different communication standards include Global System for Mobile Communications (GSM) Code Division Multiple Access (CDMA), Orthogonal Frequency Division Multiple Access (OFDMA), Long Term Evolution (LTE), Global Positioning System (GPS), Bluetooth®, Wi-Fi (IEEE 802.11), Near Field Communication (NFC), Internet/Intranet (TCP/IP), Internet of Things (IOT), as well as various other communication standards. In addition, the mobile wireless communication device 102 may utilize a number of various additional forms of communication including systems and protocols that support a communication diversity scheme, as well as carrier aggregation and simultaneous voice and data signal propagation.

In addition to the wireless communication interface 502, in the present instance, the wireless communication device 100 additionally includes a peripheral communication interface 206, which can be used to be selectively coupled to a corresponding peripheral communication interface 406 in an associated peripheral 300, where the selectively coupled peripheral can extend or enhance the functionality of the respective mobile wireless communication device 100 to which it is selectively associated including an attachment, either directly or indirectly. The selectively associated peripheral communication interfaces 206 and 406, when operationally coupled, allow electrical signals including data and power to be conveyed between the two devices 100 and 300. However, when signals are being conveyed via the respective peripheral communication interfaces 206 and 406, there is the potential for any concurrent wireless communications via the wireless communication interface 502 to be negatively affected. More specifically, the signals produced as part of the signals conveyed across the peripheral communication interfaces can sometimes produce noise and/or interference that can serve to desensitize a radio frequency receiver 506, and/or negatively affect any corresponding transmission of a wireless signal via a radio frequency transmitter 504. While in some instances some of the potential for negative effects can be mitigated using various shielding techniques, it is not always possible to provide shielding, which can reduce and/or eliminate the potential for negative effects completely. Generally, it can be difficult to provide mitigation for effects that may not always be present, and/or where the specific nature of the effects may change dependent upon the type of and/or the particular peripheral 300 that may be currently being used with the wireless communication device 100.

However, by monitoring performance, and correspondingly adjusting the values of the operating parameters associated with the peripheral communication interface 206 and 406, one may be able to change the degree to which the communication via the peripheral communication interface 206 and 406 can affect any concurrent wireless communication via the wireless communication interface 502. Examples of operating parameters that may be able to be adjusted relative to a communication interface can include a selected data rate and/or a selected signal amplitude. For example, as illustrated in FIG. 6, a peripheral communication interface may accommodate multiple data rates, at least some of which may be predetermined. The different predetermined data rates can be separately identified using multiple gear designations 602, where each gear can include multiple rates 604, which may be separately identified using one or more various types of designations. In the embodiment illustrated in FIG. 6, at least 3 different gears are designated, and each gear is shown as supporting a pair of data rates.

In at least the embodiment illustrated in FIG. 5, the operation of the peripheral communication interface 206 and 406 can be managed by a peripheral communication interface management controller 520, that can be present in one or both of the wireless communication device 100 and/or the peripheral 300. It is further possible that portions of the peripheral communication interface management controller 520 can be distributed between the wireless communication device 100 and the peripheral 300. The peripheral communication interface management controller 520 includes a performance monitoring module 522. The performance monitoring module 522 monitors the performance of the wireless communication via the wireless communication interface 502, while the wireless communication device 100 is communicating with a coupled peripheral 300 via the peripheral communication interface 206. For example, characteristics such as a received signal strength indicator (RSSI), a reference signal received power (RSRP), a reference signal received quality (RSRQ), and a signal to noise ratio (SNR) can be monitored and used to assess performance. The use of other types of measurable characteristics could also be possible.

A reference power can be received via the modem 518 of the wireless communication interface 502 by a reference power threshold detection module 524 of the peripheral communication interface management controller 520, and the detected reference power can be compared relative to one or more predefined thresholds to determine if the detected reference power has fallen below the corresponding threshold. For example, the detection of a reference power can include a measurement of the reference signal received power (RSRP). Such a measurement in at least some instances can relate to the relative distance between the wireless communication device and the current wireless network 514 access point, such as a base station 512. For example, relative to at least one type of a network, a reference signal received power (RSRP) measurement of −75 dBm can correspond to a wireless communication device being relatively close to a particular base station, while a measurement of −120 dBm may correspond to the same wireless communication device being considered proximate to the edge of coverage relative to the same base station. A measurement for a reference signal received power (RSRP) can be helpful in predicting the potential impact, that interference associated with communications via another interface might have. Generally, the farther one is away from a current wireless communication partner, the weaker the signals being conveyed between the two will generally be. The weaker the signals are between the two, the more likely that nearby sources of interference will have an effect on the communications.

While in some instances, the reference power threshold detection module 524 will make use of a single particular threshold, in other instances the alternative use of multiple thresholds may be possible, where the particular threshold that is used may be based upon the current value of another operating parameter. For example, in at least some instances, the particular predefined threshold value that may be used by the reference power threshold detection module 524 may be based upon the particular gear within which the peripheral communication interface 206 is currently operating. FIG. 7 illustrates a table 700 highlighting the possibility of a respective one of multiple thresholds 702, which could be alternatively used with each of a plurality of data rates, or gears 704. The different respective thresholds might alternatively provide an indication at which level of received power of the reference signal (RSRP) that there may be a concern relative to each of a plurality of different peripheral communication interface data rates.

The peripheral communication interface management controller 520 further includes a relative signal quality measurement determination module 526, which when the reference power has been detected to be below the applicable threshold, processes a relative signal quality measurement for the wireless communication received via the modem 518 of the wireless communication interface 502 for each of a plurality of different sets of values of operating parameters associated with the peripheral communication interface 206. In at least some instances, a reference signal received quality (RSRQ) measurement can be used as the relative signal quality measurement, where a corresponding measurement is determined for each of the different sets of possible values of operating parameters. For example, a relative signal quality measurement may be made for each of the permissible combinations of gear/data rate and signal amplitude.

However with respect to some combinations of wireless communication devices 100 and peripherals 300, some of the different sets of values of operating parameters may generally be identified as not being preferred or allowed. A list including the permissible sets of operating parameter values will sometimes be available. In at least some instances, the list will be available in either the peripheral 300 or the wireless communication device 100. In at least some instances, the list identifying the preferred or the allowed sets of operating parameters will be based upon the data throughput requirements corresponding to the extended capability 534 being provided by the peripheral in conjunction with the wireless communication device 100. For example, if a particular combination for data rate and signal amplitude will not be sufficient for supporting the extended capability, the particular combination could generally be identified as not being allowed.

FIG. 8 illustrates an exemplary table 800 including the different sets of values of operating parameters that may be permitted with a particular wireless communication device 100 and peripheral 300 combination. For example, at each possible data rate or gear 802, the table 800 will identify the combination of signal amplitudes 804, that can meet the data throughput demands between the peripheral 300 and the wireless communication device 100, in order to support the intended functioning of the peripheral 300 in combination with the wireless communication device 100. In the example illustrated, gear 3B is allowed with a large amplitude. Gear 3A is allowed with either a large amplitude or a small amplitude. Gears 2B through 1A do not satisfy performance expectations with either large or small signal amplitude. As such, when the relative signal quality measurement determination module 526 determines a relative signal quality measurement for the wireless communication via the wireless communication interface 502 for each of the plurality of different sets of values of operating parameters, a value does not need to be determined for gears 2B through 1A or for gear 3A having a small amplitude. The list 800 of different sets of values of operating parameters, that are permissible in support of communication, as well as the supporting controllers and/or modules can be included in the peripheral 300, the wireless communication device 100 or the network environment 510. In the particular embodiment illustrated, the list 800 is included and maintained in a data storage module 532 contained in the peripheral 300, and is managed by a permissible operating parameter values controller 536.

Once a relative signal quality measurement is determined for each of the allowable sets of operating parameters, a peripheral communication interface operation parameter value selection module 528 of the peripheral communication interface management controller 520 can make the selection between each of the different allowable sets of operating parameters taking into account the determined relative signal quality measurements. The corresponding set of values of operating values can then be applied to the peripheral communication interface 206 and 406.

In at least some instances, the operating condition selection results 540 can be stored in a data storage module 542 of the wireless communication device 100. While in the illustrated embodiment, the selection results 540 are stored in the wireless communication device 100, similar to the list 800 of different permissible sets of values of operating parameters, the selection results could be stored in either the wireless communication device 100, the peripheral 300 and/or the network environment 510. When stored, the selection results can generally be associated with a set of corresponding operating conditions including an identification of the particular wireless communication device as well as the type of device, the particular peripheral as well as the type of peripheral, and the operating band of the wireless communication interface within which the wireless communication device 100 was operating, when the relative signal quality measurements were determined.

The degree to which communications via a peripheral communication interface may impact a wireless communication via a wireless communication interface can be dependent upon the particulars of the above noted corresponding operating conditions. For example, The nature of any interference produced through a communication interface will be dependent upon the structures associated with each of the interacting elements. Component placement and the nature or the layout of the conductive connections or traces, as well as the particular values of the components, can impact the nature of any interfering noise that might be produced. The component placement and the layout of the conductive connections are generally unique to each type of device. Furthermore, component values between particular devices within a given type can sometimes vary, which in turn can impact the nature of any interfering noise that might be produced. Still further, the degree of interference can differ relative to each of the operating bands, where each set of operating conditions relative to the peripheral communication interface has the potential to produce a different degree of noise or interference relative to each of the different sets or bands of frequencies. As such, when the results of selections are stored it may be helpful to know the corresponding operating conditions, when the relative signal quality measurements were determined upon which the selection was made.

By including the corresponding operating conditions, it may be possible to detect instances where there is a match to similar future operating conditions. This may enable a stored previous determination to be used in connection with the selection of values of operating parameters for use with the future instance having the same or similar operating conditions, without having to go through the entire detection, determination, and selection process. In at least some instances, the controller 520 can include a corresponding matched future conditions determination module 530, which can be used to manage the association of future conditions with previously stored results without having to go through a more recent determination of the relative signal quality measurements for each of the plurality of different sets of values of operating parameters associated with the peripheral communication interface 206 and 406.

Each of the above noted controllers, as well as the corresponding modules, can be implemented in various combinations of hardware and/or software using one or more of discrete logic elements, state machines, gate arrays, processors, firmware, as well as one or more sets of pre-stored instructions 544 or 546 stored in the one or more respective data storage modules 542 or 532 to be executed by the various controllers 520 or 536. While the data storage modules 542 and 532, are illustrated as being separate from the respective controllers 520 and 536, it is possible that the controllers 520 and 536 could have integrated data storage, which could be used to store all or some of the elements, which are presently being shown as being included as part of the separate data storage modules 542 and 532.

Figure 9:
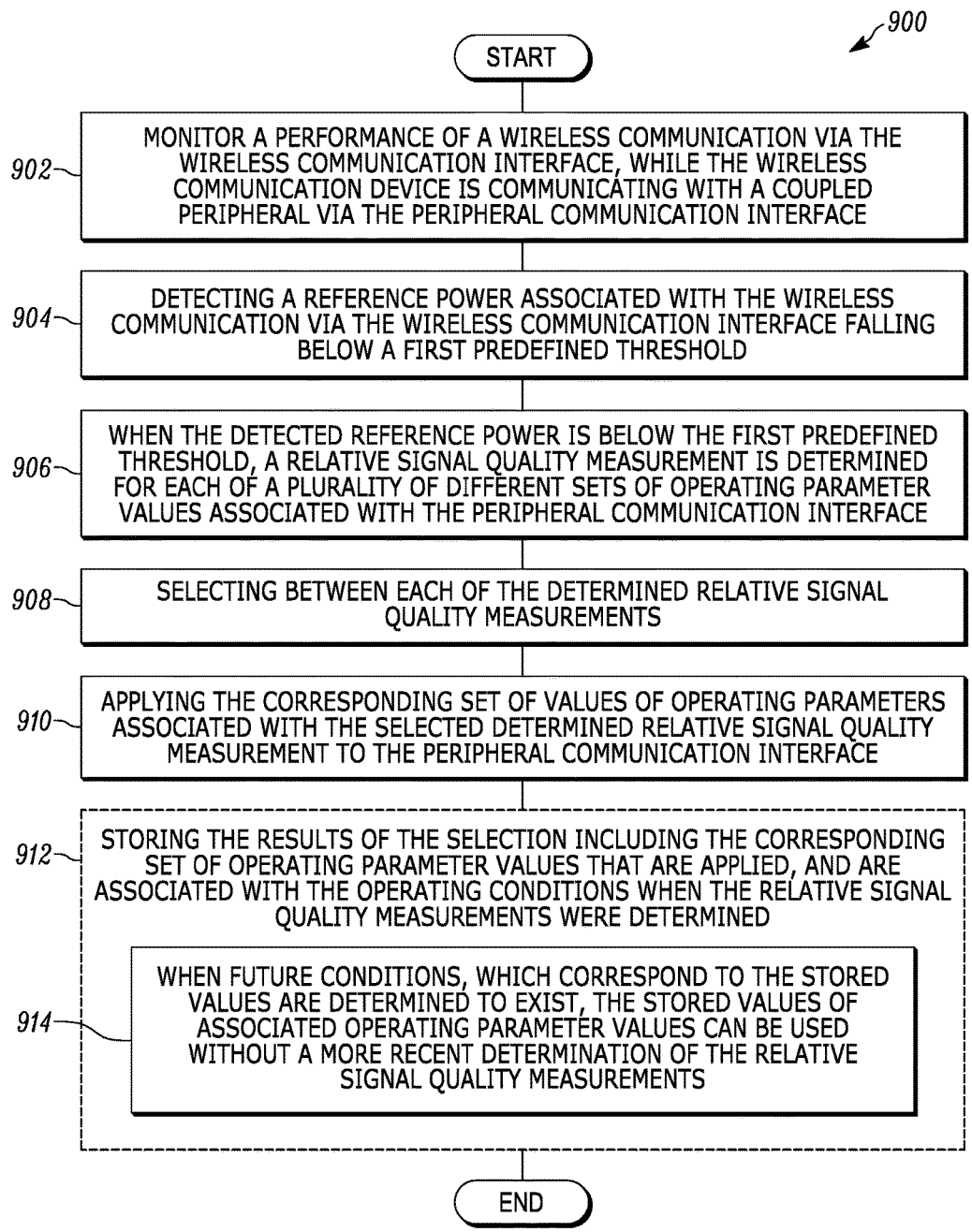
FIG. 9 is a flow diagram of a method for managing values of operating parameters used with a peripheral communication interface to communicatively couple a wireless communication device to a peripheral.

FIG. 9 illustrates a flow diagram of a method 900 for managing values of operating parameters used with a peripheral communication interface 206 and 406 to communicatively couple a wireless communication device 100 to a peripheral 300. The method 900 includes monitoring 902 a performance of a wireless communication via the wireless communication interface, while the wireless communication device is communicating with a coupled peripheral via the peripheral communication interface. A reference power associated with the wireless communication via the wireless communication interface falling below a first predefined threshold is then detected 904. When the reference power which has been detected is below the first predefined threshold, a relative signal quality measurement for the wireless communication via the wireless communication interface is determined 906 for each of a plurality of different sets of values of operating parameters associated with the peripheral communication interface. The method further includes selecting 908 between each of the determined relative signal quality measurements, which respectively correspond to each of the plurality of different sets of values of operating parameters associated with the peripheral device, and applying 910 the corresponding set of values of operating parameters associated with the selected determined relative signal quality measurement to the peripheral communication interface.

In some instances, the method can further include storing 912 the results of the selection between each of the determined relative signal quality measurements including the corresponding set of values of operating parameters that are applied, and which are associated with the operating conditions of the wireless communication interface, when the relative signal quality measurements were determined. When future conditions, which correspond to the stored values are determined to exist, the stored values of associated operating parameter values can then be used 914 without a more recent determination of the relative signal quality measurements for each of the plurality of different sets of values of operating parameters associated with the peripheral communication interface.

In at least some instances, the above noted method can be used in connection with a wireless communication device having a wireless communication interface coupled to an antenna via at least one of a transmitter and a receiver, through which the wireless communication device can communicate with one or more other wireless communication devices, and where the wireless communication device has a peripheral communication interface, separate from the wireless communication interface, for communicatively coupling to at least one of one or more peripherals. The use of the method in connection with other environments may also be possible.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. In a wireless communication device having a wireless communication interface coupled to an antenna via at least one of a transmitter and a receiver, through which the wireless communication device can communicate with one or more other wireless communication devices, and having a peripheral communication interface, separate from the wireless communication interface, for communicatively coupling to at least one of one or more peripherals, a method for managing values of operating parameters used to communicate via the peripheral communication interface so as to reduce an impact on wireless communications via the wireless communication interface, the method comprising:
monitoring a performance of a wireless communication via the wireless communication interface, while the wireless communication device is communicating with a coupled peripheral via the peripheral communication interface;
detecting a reference power associated with the wireless communication via the wireless communication interface falling below a first predefined threshold;
when the reference power which has been detected is below the first predefined threshold, a relative signal quality measurement for the wireless communication via the wireless communication interface is determined for each of a plurality of different sets of values of operating parameters associated with the peripheral communication interface; and
selecting between each of the determined relative signal quality measurements, which respectively correspond to each of the plurality of different sets of values of operating parameters associated with the peripheral device, and applying the corresponding set of values of operating parameters associated with the selected determined relative signal quality measurement to the peripheral communication interface.

2. A method in accordance with claim 1, wherein the operating parameters used to communicate via the peripheral communication interface includes values corresponding to each of one or more predefined data rates.

3. A method in accordance with claim 2, wherein each of the one or more predefined data rates corresponds to a respective one of one or more gears.

4. A method in accordance with claim 1, wherein the operating parameters used to communicate via the peripheral communication interface includes values, which select between multiple predefined signal amplitudes.

5. A method in accordance with claim 1, further comprising storing the results of the selection between each of the determined relative signal quality measurements including the corresponding set of values of operating parameters that are applied, and which are associated with the operating conditions of the wireless communication interface, when the relative signal quality measurements were determined.

6. A method in accordance with claim 5, wherein the operating conditions of the wireless communication interface associated with the stored results includes a radio frequency band of operation.

7. A method in accordance with claim 5, wherein the operating conditions of the wireless communication interface associated with the stored results includes an identification value of the type of wireless communication device.

8. A method in accordance with claim 7, wherein the identification value of the type of wireless communication device, which is associated with the stored results further include an identification extension, that identifies a particular one of the wireless communication devices of the type of wireless communication device.

9. A method in accordance with claim 5, wherein the operating conditions of the wireless communication interface associated with the stored results includes an identification value of the type of peripheral.

10. A method in accordance with claim 9, wherein the identification value of the type of peripheral, which is associated with the stored results further include an identification extension, that identifies a particular one of the peripherals of the type of peripheral.

11. A method in accordance with claim 5, wherein once the results of a particular selection is determined and stored, when future conditions, which correspond to the stored values are determined to exist, the stored values of associated operating parameter values can be used without a more recent determination of the relative signal quality measurements for each of the plurality of different sets of values of operating parameters associated with the peripheral communication interface.

12. A method in accordance with claim 1, wherein the different sets of values of operating parameters, which are permissible in support of communication between the wireless communication device and the peripheral are received from the peripheral or from the wireless communication device.

13. A method in accordance with claim 12, where the peripheral will know the different sets of values of operating parameters, which will support the data throughput requirements between the wireless communication device and the peripheral for supporting the operation of the peripheral.

14. A wireless communication device adapted for use with one or more selectively coupleable peripherals, the wireless communication device comprising:
a wireless communication interface coupled to an antenna via at least one of a transmitter and a receiver, through which the wireless communication device can communicate with one or more other wireless communication devices;
a peripheral communication interface, separate from the wireless communication interface, for communicatively coupling to at least one of the one or more selectively coupled peripherals; and
a peripheral communication interface management controller for managing the peripheral communication interface, including when the wireless communication device is communicating with the one or more other wireless communication devices via the wireless communication interface, the peripheral communication interface management controller including
- a performance monitoring module adapted for receiving information about a performance of a wireless communication via the wireless communication interface, while the wireless communication device is communicating with a coupled peripheral via the peripheral communication interface,
- a reference power threshold detection module adapted for detecting a reference power associated with the wireless communication via the wireless communication interface falling below a first predefined threshold,
- a relative signal quality measurement determination module adapted for determining a relative signal quality measurement for the wireless communication via the wireless communication interface for each of a plurality of different sets of values of operating parameters associated with the peripheral communication interface, when the reference power which has been detected is below the first predefined threshold, and
- a peripheral communication interface operation parameter value selection module adapted for selecting between each of the determined relative signal quality measurements, which respectively correspond to each of the plurality of different sets of values of operating parameters, and applying the corresponding set of values of operating parameters associated with the selected determined relative signal quality measurement to the peripheral communication interface.

15. A wireless communication device in accordance with claim 14, further comprising a data storage module, which includes the results of the selection between each of the determined relative signal quality measurements including the corresponding set of values of operating parameters that are applied, associated with the operating conditions of the wireless communication interface, when the relative signal quality measurements were determined.

16. A wireless communication device in accordance with claim 15, wherein the peripheral communication interface management controller further includes a matched future conditions determination module, where once the results of a particular selection is determined by the peripheral communication interface operation parameter value selection module and is stored, the matched future conditions determination module is adapted to recognize when future conditions, which correspond to the stored values are determined to exist, and using the stored values of associated operating parameter values with the peripheral communication interface without a more recent determination of the relative signal quality measurements for each of the plurality of different sets of values of operating parameters associated with the peripheral communication interface.

17. A wireless communication device in accordance with claim 15, wherein the data storage module further includes one or more sets of instructions for use with one or more modules of the peripheral management controller.

18. A peripheral adapted for use with a wireless communication device, the peripheral comprising:
- a peripheral communication interface, via which the peripheral is adapted for communicating with an attached wireless communication device; and
- a permissible operating parameter values controller, which is adapted for identifying a type of wireless communication device to which the peripheral is attached, and supplying different sets of values of operating parameters, which are permissible in support of communication between the wireless communication device and the peripheral.

19. A peripheral in accordance with claim 18, further comprising a data storage module which includes the different sets of values of operating parameters, which are permissible in support of communication between the peripheral and the wireless communication device for each of one or more different types of wireless communication devices.

20. A peripheral in accordance with claim 19, wherein the data storage module further includes one or more sets of instructions for use with the permissible operating parameters value controller.

* * * * *